United States Patent [19]

Blohm et al.

[11] Patent Number: 4,538,717

[45] Date of Patent: Sep. 3, 1985

[54] CONTROL APPARATUS FOR A STEP DRIVE

[75] Inventors: Knud Blohm, Nordborg; Egon Krogh, Sonderborg, both of Denmark

[73] Assignee: Danfoss A/S, Nordborg, Denmark

[21] Appl. No.: 463,905

[22] Filed: Feb. 4, 1983

[30] Foreign Application Priority Data

Feb. 16, 1982 [DE] Fed. Rep. of Germany ....... 3205500

[51] Int. Cl.³ ..................... F16D 67/02; B60K 41/24; B60K 41/28
[52] U.S. Cl. ................. 192/0.094; 74/813 C; 74/814; 192/12 D; 192/33 R; 192/142 R; 192/150
[58] Field of Search .............. 192/12 D, 150, 142 R, 192/0.034, 0.094, 33 R; 74/813 C, 814, 821

[56] References Cited

U.S. PATENT DOCUMENTS

| | | | |
|---|---|---|---|
| 2,853,900 | 9/1958 | Hillyer | 192/142 R X |
| 2,946,418 | 7/1960 | Leeson | 192/12 D |
| 2,979,972 | 4/1961 | Danly | 192/142 R X |
| 3,085,668 | 4/1963 | Block et al. | 74/821 X |
| 3,399,751 | 9/1968 | Hakata | 192/142 R |
| 3,450,910 | 6/1969 | Jaeschke et al. | 192/12 D X |
| 3,602,348 | 8/1971 | Mohr | 192/33 X |
| 3,741,357 | 6/1973 | Krysiuk et al. | 192/12 D |
| 3,888,338 | 6/1975 | Mars | 192/142 |
| 4,040,508 | 8/1977 | Sunada et al. | 192/12 D |
| 4,478,322 | 10/1984 | Carlson et al. | 192/0.094 X |

OTHER PUBLICATIONS

Danfoss, "Actuators and Accessories for Incremental Motion Control," CK.54.A3.02, 1980, pp. 1–15.
"Stepping Motor Control Circuit", Fegley et al., Western Electric Technical Digest No. 18, Apr. 1970, pp. 15–16.

Primary Examiner—Rodney H. Bonck
Attorney, Agent, or Firm—Wayne B. Easton

[57] ABSTRACT

The invention relates to a step drive assembly which includes a rotatable operating unit for operating a tool or knife or the like. The assembly has a change-over clutch for selectively connecting the operating unit to a continuously running motor or a brake. Control apparatus for the assembly includes a disk rotatable with the operating unit having teeth and spaces therebetween forming zones and a sensor unit for scanning the zones and outputting a pulse train. An evaluating circuit responsive to the pulse train outputs a positioned stop signal and an overload stop signal to effect a braking operation.

10 Claims, 7 Drawing Figures

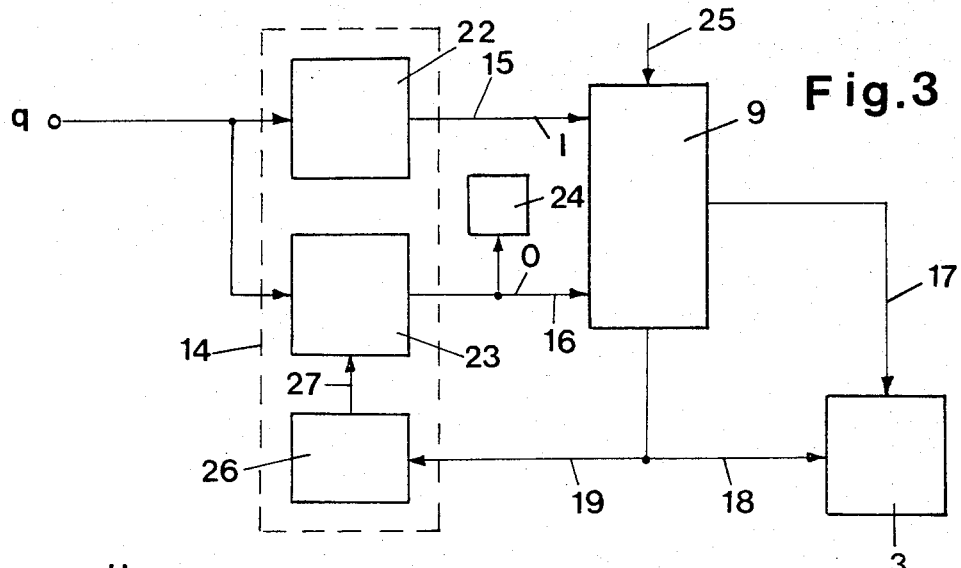
Fig. 3
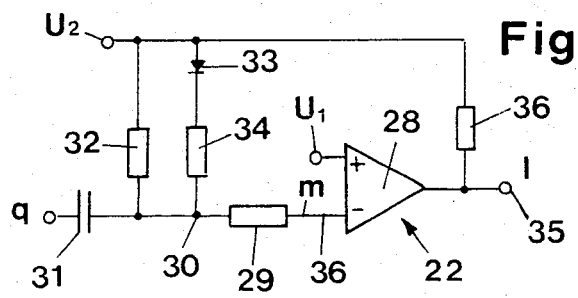
Fig. 4
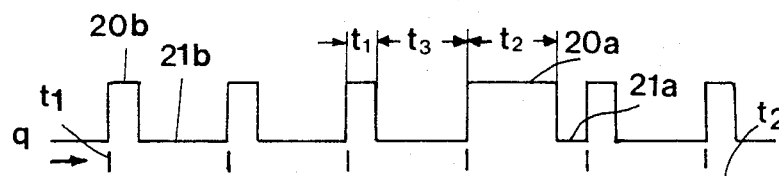
Fig. 5
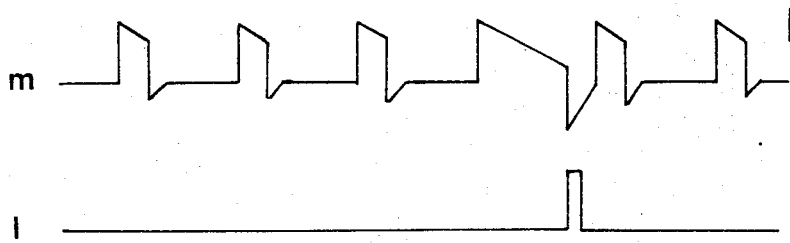
Fig. 6
Fig. 7

CONTROL APPARATUS FOR A STEP DRIVE

The invention relates to control apparatus for a step drive of which the rotary operating element can be selectively coupled by a change-over clutch to a continuously running motor or a stationary brake, comprising scanning means having a disc which is connected to the operating element and has first and second zones of different condition on a circular track and a stationary sensor scanning the zones and giving a pulse train as sensing signal, and comprising an evaluating circuit which, in response to the pulse train, delivers a positional stop signal for changing to brake operation.

In a known control apparatus of this kind (Danfoss Leaflet "Step activators for step control" CK.54, 1980), a disc with peripheral incisions is scanned by a photoelectric sensor. As soon as the sensor detects an incision, it gives a pulse. From this, the evaluating circuit produces a stop signal with the aid of which the operating element is halted in a defined angular position. The incisions are uniformly distributed over the disc circumference. Their number corresponds to the number of step positions provided per revolution of the operating element. For very many applications, it is sufficient to provide only one incision or a few.

The invention is based on the problem of providing control apparatus of the aforementioned kind with which the step drive can be effectively protected against overload.

This problem is solved according to the invention in that for a toothed wheel the first zones or spaces between teeth comprise at least one section or spaces of larger width and further sections of smaller width adjacent to sections or teeth of equal width adjacent to the second zones which are the teeth. The evaluating circuit comprises two time comparator circuits for delivering the positional stop signal and an overload stop signal, of which the first responds when the respective scanning time of a first zone exceeds a first limiting value and the second responds when the respective scanning time of a second zone exceeds a second limiting value. The first limiting value is larger than the scanning time of the sections of smaller width and less than the scanning time of the sections of larger width of the first zones at nominal rotary speed of the operating element. The second limiting value is larger than the scanning time of the sections of equal width of the second zones at nominal speed of the operating element.

In this construction, the scanning apparatus not only serves to detect the positions in which the operating element is to be halted but at the same time to detect overloading or blocking of the operating element. such overloading leads to slower rotation and hence increased scanning times for all the scanned zones. The overload condition can therefore be detected by a time comparison and eliminated by the overload stop signal which is released when appropriate. This stop signal can change to brake operation or switch off the continuously running motor. It may also activate a suitable indicator or alarm. It will depend on individual cases whether the standstill is final or further starting attempts are made.

The two functions are differentiated in that the same pulse train is fed to two different time comparator circuits, each of which is associated with a limiting value. The one time comparator circuit evaluates the scanning times of the first zones so that only the sections of larger width actuate a positional stop signal. The other time comparator evaluates the scanning times of the second zones so that, on an increased scanning time caused by overload, the overload stop signal is released. In this way it is possible to monitor both functions with a minimum of additional expedients.

In an alternative embodiment, the set problem is solved in that the first zones comprise at least one section of larger width and further sections of smaller width adjacent to sections of equal width of the second zones, that the evaluating circuit comprises two time comparator circuits for delivering the positional stop signal and an overload stop signal, of which the first responds when the respective scanning time of a first zone exceeds a first limiting value and the second responds when the respective scanning time of a first and an adjacent second zone exceeds a second limiting value, that the first limiting value is larger than the scanning time of the sections of smaller width and less than the scanning time of the sections of larger width of the first zones at nominal rotary speed of the operating element, and that the second limiting value is larger than the sum of the scanning time of a first and an adjacent second zone at nominal speed of the operating element.

This embodiment has the same advantages as the first solution. However, the second time comparator circuit can be of simpler construction because it need only respond to like flanks of the pulse train.

In a preferred embodiment, the time comparator circuit is a flank detector circuit which, after the first limiting value is exceeded, delivers the positional stop signal on the occurrence of the flank of the pulse train that characterises the end of the scanning time of the first zone. Because the positional stop signal is delayed until the appearance of the said flank, one achieves very accurate positioning of the operating element despite the time comparison.

In particular, the flank detector circuit may comprise a differential amplifier of which the non-inverting input is applied to a first reference voltage and the inverting input is connected by way of a series resistor to a point which is applied on the one hand by way of a condenser to the sensor signal input and on the other hand by way of a discharge resistor to a second higher reference voltage. This gives a particularly simple circuit for achieving time comparison on the one hand and the delayed delivery of the stop signal on the other hand.

The series circuit of a diode and an additional resistor can here be in parallel with the discharge resistor. This results in more rapid discharge of the condenser after the input pulse disappears.

The second time comparator circuit is advantageously a monostable multivibrator of which the resetting time corresponds to the second limiting value, which is triggered by repeating parts of the pulse train and which delivers the overload stop signal in the stable condition. This multivibrator normally stays in its unstable condition and, at nominal speed, it has fed to it another trigger pulse after each time interval which is shorter than the resetting time. If the overload stop signal is obtained by monitoring the scanning time of the second zones, the multivibrator may be triggered by scanning parts of the pulse train corresponding to the first zones.

If the overload stop signal is released by monitoring the sum of the scanning time of a first zone and an adjacent second zone, the multivibrator may be triggered by a pulse initiated on passing from the second zone to the first zone. This pulse can at the same time be used for activating the first time comparator circuit.

Further, a starting time generator is advisable which, for a predetermined time after switching to motor operation, inhibits the delivery of an overload stop signal and a positional stop signal. This can allow for the fact that in some cases a short time elapses after switching to motor operation before the operating element reaches its full nominal speed even though there is no overload.

It is advisable for the sections of smaller width of the first zones to be narrower than the adjacent sections of equal width of the second zones. This gives the largest possible difference in the width of the sections of the first zones and hence facilitates differentiation. On the other hand, the sections of the second zones responsible for monitoring overload become comparatively wide, so that correspondingly large changes in the scanning times are produced on overload.

In addition, more reliable functioning is ensured over a larger range of rotary speed.

In a control apparatus comprising a disc which is scanned by a photoelectric sensor and of which the first and second zones are formed by incisions and teeth remaining therebetween, a disc is preferably used with a multiplicity of uniformly arranged teeth and, to achieve a section of larger width in the first zone, an incision is enlarged by sacrificing part of one tooth. The production of such a disc is very simple because it has a uniform pitch and somewhat wider incisions at only isolated positions. Such a disc is particularly suitable for operation in both directions of rotation.

The invention will now be described in more detail with reference to preferred examples shown in the drawing, wherein:

FIG. 1 diagrammatically shows a step drive employing the control apparatus of the invention;

FIG. 3 is a block diagram of the control apparatus;

FIG. 4 is a circuit diagram for a first time comparator;

FIG. 5 shows the input signal of this circuit;

FIG. 6 shows the input signal of the comparator of this circuit; and

FIG. 7 shows the output signal of this circuit.

Figure 1:
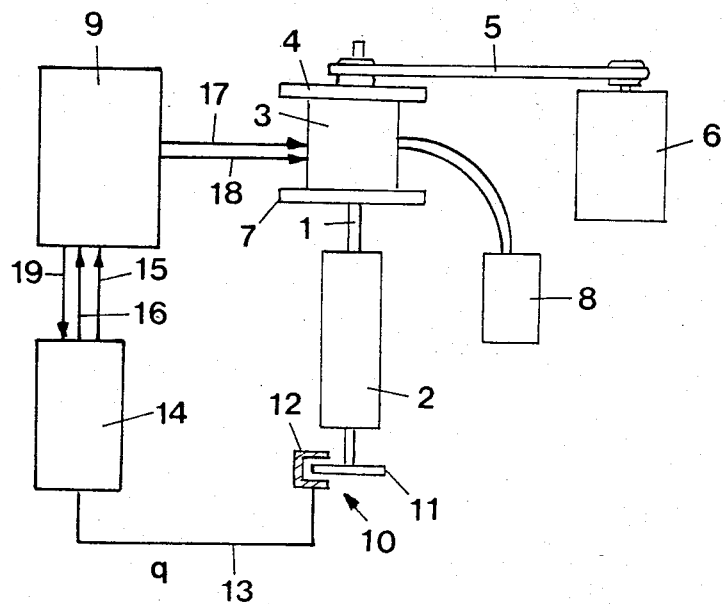

In the step drive of FIG. 1, the shaft (1) of a rotatable operating element 2 is, by means of a change-over clutch 3, selectively couplable to a continuously running motor 6 or a stationary brake disc 7 by way of a drive disc 4 and a belt 5. Coupling takes place with the aid of vacuum produced by a vacuum pump 8 and fed to the coupling members by way of valves (not shown) disposed in the change-over apparatus 3. The valves are magnetic valves excited by a control unit 9. A scanning apparatus 10 comprises a disc 11 on the shaft 1 of operating element 2 and a photoelectric sensor 12 of which the sensing signal is fed to an evaluating circuit 14 by a line 13. This evaluating circuit 14 delivers stop signals through two lines 15 and 16 to the control unit 9 which, through line 17, gives a corresponding stop signal to the change-over clutch 3, with the result that the latter is switched to brake operation. By reason of external commands, the control unit 9 delivers a start signal through line 18 to the change-over clutch 3 so that there is a change to motor operation. At the same time, a start signal goes through line 19 to the evaluating circuit 14.

Figure 2:
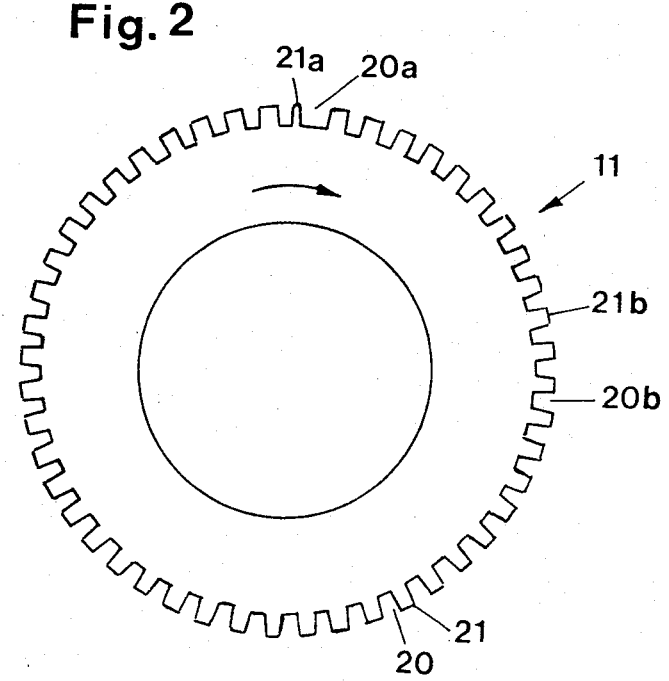
FIG. 2 shows a disc for the scanning apparatus of the control apparatus according to the invention.

FIG. 2 shows disc 11 of the scanning apparatus 10 to an enlarged scale. At its periphery, the disc has incisions 20 and teeth 21 which form two alternate zones of different condition, namely transparent and opaque. These zones have a uniform pitch. The first zones comprise a section 20a of larger width and 47 sections 20b of smaller width. The second zones 21 comprise a section 21a of smaller width and 47 sections 21b of larger width. The ratio is chosen so that the width of sections 21b is larger than that of sections 20b but less than that of sections 20a. With uniform rotation, disc 11 therefore produces a sensing signal q having the form of the pulse train in FIG. 5.

In accordance with FIG. 3, this sensing signal q is fed in the evaluating circuit 14 to a first time comparator circuit 22 and a second time comparator circuit 23. Time comparator circuit 22 gives a positional stop signal 1 through line 15 to control unit 9 when the scanning time of the first zones 20 falls below a first limiting value g1. This limiting value lies between the scanning time t1 for sections 20b of smaller width and scanning time t2 for the section 20a of larger width when the disc 11 is at nominal speed. Time comparator circuit 23 gives an overload stop signal o to control unit 9 and to an indicating apparatus 24 through line 16 when a second limiting value g2 is exceeded. The operating element 2 therefore comes to a standstill either when a position is reached in which the wider section 20a is being scanned or when the operating element is overloaded and its rotary speed therefore drops below nominal. When the control unit 9 is supplied with a start signal by way of an input 25, a corresponding start signal goes to changeover clutch 3 through line 18 so that the coupling disc 4 becomes operative. At the same time, a corresponding start signal goes through line 19 to a time generator 26 which, for a short period after starting, applies a blocking signal through line 27 to time comparator circuit 23 so that no overload stop signal o can be delivered during this period.

Two manners of operation are possible for detecting overload:

(a) The time comparator circuit 23 compares with the second limiting value g2 the scanning time t3 of the sections 21b of equal width of the second zones 20. In this case, limiting value g2 must be somewhat larger than the scanning time t3 at nominal rotary speed of disc 11.

(b) The time comparator circuit 23 compares with the second limiting value g2 the sum of the scanning times t1+t3 of a first zone 20 and an adjacent second zone 21. This limiting value must then be somewhat larger than the sum t1+t3 at nominal speed of disc 11.

In a practical example, limiting value g1 of the first time comparator circuit 22 had a value of 5 ms. The arrangement was therefore able to work correctly in a speed range of which the upper limit was given by t2 < 5 ms and the lower limit by t1 > 5 ms. The second limiting value g2 of the second comparator circuit 23 had a value of 4 ms for embodiment (a) and a value of 7 ms for embodiment (b). The blocking time of time generator 26 amounted to 40 ms.

The time comparator circuit 22 can have the FIG. 4 construction. It comprises a comparator 28 in the form of a differential amplifier to which a positive reference voltage $U_1$ is applied at the non-inverting input. The inverting input is connected by way of a resistor 29 to a point 30 which is connected on the one hand to the input by way of a condenser 31 and on the other hand to a reference voltage $U_2$ higher than $U_1$ by way of a discharge resistor 32. The series circuit of a diode 33 and an additional resistor 34 is in parallel with the discharge resistor 32. The output 35 is connected to reference voltage $U_2$ by way of a resistor 36. By reason of condenser 31 and discharge resistors 32 and 34, the pulse signal m of FIG. 6 is produced at the inverting input 36 of comparator 28. For each positive flank of the pulses of the sensing signal q, the voltage at input 36 jumps to a positive value which, however, decreases with time by reason of discharge of the condenser 31. As long as the pulses only last during the scanning time t1, the negative peak at the rear flank of each pulse is too small to allow comparator 28 to respond. If, however, condenser 31 discharges during the scanning time t2 of section 20a, the voltage at input 36 jumps to such a high negative value at the rear flank that the value of reference voltage U1 is exceeded. Consequently, the positional stop signal 1 of FIG. 7 is released at the rear flank of the wide pulse. Because of the parallel connection of diode 33 in series with resistor 34, discharging of a condenser 31 at negative voltage is more rapid than at positive charge. For example, reference voltage $U_1 = +3$ V and reference voltage $U_2 = +5$ V.

The time comparator circuit 23 consists of a monostable multivibrator of which the return time determines the second limiting value g2.

(a) In embodiment a, the return time is somewhat larger than scanning time t3 of sections 20b. The positive pulses of the sensing voltage q bring the monostable multivibrator to its unstable state every time. It remains there because it is always triggered by a new positive pulse before expiry of the resetting time. It is only when the scanning time of section 20b rises on account of slower rotation than the resetting time is exceeded, so that one may use the signal delivered by the monostable multivibrator in the stable condition as an overload stop signal o. It will be seen that this manner of operation applies to both directions of operation.

(b) In embodiment b, the return time of the multivibrator is somewhat larger than the sum of the scanning times t1+t3 at nominal speed. The multivibrator is each time operated by trigger pulses t1 when the sensing voltage goes from a section 21b of the second zone to a section 20b of the first zone. Consequently, the multivibrator here again remains in its unstable condition because it is operated by a trigger pulse before each expiry of the resetting time. Only if slower rotation causes the sum of the scanning times of sections 20b and 21b to rise will this resetting time be exceeded, so that the monostable multivibrator drops back to the stable condition and can deliver an overload stop signal o. With rotation in the opposite direction, the trigger pulses t2 occur. Although in this case there is such a large time difference between the trigger pulse on commencement of section 20a and the next following section 20b that the multivibrator delivers an overload stop signal, this is harmless because a positional stop signal had already been delivered by the first time comparator circuit 22.

Instead of the illustrated pulse trains, one can use inverted pulse trains, for which the man skilled in the art can stipulate appropriate circuit modifications.

From the foregoing description it will be evident that the scanning apparatus 10 in conjunction with the evaluating apparatus 14 is capable of deriving from a single disc 11 not only monitoring of the position the operating element 2 but also monitoring of the overload condition of this element. As long as there is no overloading or blocking, the operating element 2 is stopped on each occurrence of the positional stop signal 1 and it is only on the occurrence of a new start signal at input 25 that it is restarted for one complete revolution. The operating element can, for example, carry a knife which severs a continuously advancing tape into definite lengths. Cessation of movement on account of overloading can take place at any desired angular position of disc 11, except during the first short period after delivery of a start signal.

We claim:

1. Control apparatus for a step drive assembly which includes a rotatable operating unit and a change-over clutch unit for selectively connecting said operating unit to a continuously running motor or a stationary brake, said change-over clutch unit having input stop and start lines; said control apparatus comprising, a disk connected to said operating unit for rotation therewith and having a circular track with first and second zones, sensor means scanning said zones and outputting a pulse train, an evaluating circuit responsive to said pulse train having a first time comparator circuit for outputting a positional stop signal and a second time comparator circuit for outputting an overload stop signal, said first and second comparator circuits having respective first and second limiting time values associated therewith, said first and second zones having alternating elements with the elements of said first zone being uniformly smaller than the elements of said second zone except that at least one signal element of said first zone is the largest of all said elements, said first time comparator circuit outputting said positional stop signal when said first limiting time value is between the nominal operating speed scanning times for said signal element and for the other elements of said first zone, said second time comparator circuit outputting said overload stop signal when said second limiting value is larger than the nominal operating speed scanning times for said elements of said second zone.

2. Control apparatus according to claim 1 characterized in that said first time comparator circuit is a flank detector circuit which after said first limiting value is exceeded delivers said positional stop signal on the occurrence of the flank of the pulse train that characterizes the end of the scanning time of said signal element of said first zone.

3. Control apparatus according to claim 2 characterized in that said flank detector circuit includes a differential amplifier of which the non-inverting input receives a first reference voltage and the inverting input is connected by way of a series resistor to a point which is applied on the one hand by way of a capacitor to said pulse train and on the other hand by way of a discharge resistor to a second higher reference voltage.

4. Control apparatus according to claim 3 characterized in that a series circuit of a diode and an additional resistor is in parallel with said discharge resistor.

5. Control apparatus according to claim 2 characterized in that said second time comparator circuit is a monostable multivibrator of which the resetting time corresponds to said second limiting value which is triggered by repeating parts of said pulse train and which delivers said overload stop signal in a stable condition.

6. Control apparatus according to claim 5 characterized in that said multivibrator is triggered by scanning parts of said pulse train corresponding to said first zone.

7. Control apparatus according to claim 5 characterized in that said multivibrator is triggered by a pulse initiated on passing from said second zone to said first zone.

8. Control apparatus according to claim 2 characterized by a starting time generator which for a predetermined time after switching to motor operation inhibits the delivery of said overload stop signal and said positional stop signal.

9. Control apparatus according to claim 2 wherein said disk is scanned by a photoelectric sensor and of which said first and second zones are formed by a multiplicity of incisions and teeth remaining therebetween, said incisions and teeth including a tooth and an adjacent incision wherein said incision is larger than said tooth.

10. Control apparatus for a step drive assembly which includes a rotatable operating unit and a change-over clutch unit for selectively connecting said operating unit to a continuously running motor or a stationary brake, said change-over clutch unit having input stop and start lines; said control apparatus comprising, a disk connected to said operating unit for rotation therewith and having a circular track with first and second zones, sensor means scanning said zones and outputting a pulse train, an evaluating circuit responsive to said pulse train having a first time comparator circuit for outputting a positional stop signal and a second time comparator circuit for outputting an overload stop signal, said first and second comparator circuits having respective first and second limiting time values associated therewith, said first and second zones having alternating elements with the elements of said first zone being uniformly smaller than the elements of said second zone except that at least one signal element of said first zone is the largest of all said elements, said first time comparator circuit outputting said positional stop signal when said first limiting time value is between the nominal operating speed scanning times for said signal element and for the other elements of said first zone, said second time comparator circuit outputting said overload stop signal when said second limiting time value is larger than the combined nominal operating speed scanning times for adjacent elements of said first and second zones.

* * * * *